US012152431B2

(12) United States Patent
Crochetière et al.

(10) Patent No.: US 12,152,431 B2
(45) Date of Patent: Nov. 26, 2024

(54) FOUNDATION WINDOW ASSEMBLY AND METHOD FOR INSTALLING A FOUNDATION WINDOW FRAME INTO A FOUNDATION WALL

(71) Applicant: FENÊTRE FORM-TECH INC, Saint-Rosaire (CA)

(72) Inventors: Patrick Crochetière, St-Samuel de Horton (CA); Richard Rockwell, Drummondville (CA); Luc Lètourneau, Victoriaville (CA)

(73) Assignee: FENÊTRE FORM-TECH INC., Saint-Rosaire (CA)

( * ) Notice: Subject to any disclaimer, the term of this patent is extended or adjusted under 35 U.S.C. 154(b) by 644 days.

(21) Appl. No.: 17/172,179

(22) Filed: Feb. 10, 2021

(65) Prior Publication Data

US 2021/0246712 A1 Aug. 12, 2021

(51) Int. Cl.
*E06B 1/36* (2006.01)
*E06B 1/58* (2006.01)
(Continued)

(52) U.S. Cl.
CPC .................. *E06B 1/58* (2013.01); *E06B 1/36* (2013.01); *E06B 5/00* (2013.01); *E06B 1/34* (2013.01)

(58) Field of Classification Search
CPC ..... E06B 1/58; E06B 1/36; E06B 1/34; E06B 5/00
See application file for complete search history.

(56) References Cited

U.S. PATENT DOCUMENTS 2,893,235 A * 7/1959 Goldberg ................ E04G 15/02 52/204.55
3,769,769 A * 11/1973 Kohl ......................... E06B 5/02 52/212
(Continued)

FOREIGN PATENT DOCUMENTS

CN 106437416 A 2/2017
CN 206829907 U 1/2018
(Continued)

OTHER PUBLICATIONS

Tuf-N-Lite.pdf "Basement window systems".

*Primary Examiner* — Paola Agudelo
(74) *Attorney, Agent, or Firm* — Dorton & Willis LLP; Ryan Willis

(57) ABSTRACT

The present disclosure concerns a foundation window assembly comprising a window frame comprising a plurality of frame members, and at least one casing connector arranged on at least one of said plurality of frame members; and a window casing comprising a plurality of casing members defining together a frame-receiving opening, wherein at least one of said plurality of casing members defines a frame-abutting shoulder at least partially delimited by a casing flange portion and a frame-engaging portion. A frame-engaging recess is formed in the frame-engaging portion, the frame-engaging recess at least partially circumscribing the frame-receiving opening, the casing connector being removably engageable into the frame-engaging recess when the window frame is inserted into the frame-receiving opening. The present disclosure also concerns a method for installing a foundation window frame into a foundation wall.

15 Claims, 13 Drawing Sheets

(51) Int. Cl.
*E06B 5/00* (2006.01)
*E06B 1/34* (2006.01)

(56) References Cited

U.S. PATENT DOCUMENTS

| | | | | |
|---|---|---|---|---|
| 4,030,258 | A * | 6/1977 | Anders | E06B 3/5864 49/505 |
| 4,197,896 | A | 4/1980 | Reichstadt | |
| 4,246,731 | A * | 1/1981 | Miro | E06B 1/342 52/656.5 |
| 4,430,831 | A * | 2/1984 | Kemp | E04G 15/02 49/504 |
| 4,589,624 | A * | 5/1986 | Jones | E04G 15/02 249/177 |
| 5,067,540 | A * | 11/1991 | Besler | E06B 9/17061 160/31 |
| 5,155,956 | A * | 10/1992 | Norment | E06B 1/6053 52/745.16 |
| 5,169,544 | A * | 12/1992 | Stanfill | E04G 15/02 249/97 |
| 6,173,541 | B1 * | 1/2001 | Petta | E06B 1/24 52/204.5 |
| 6,185,884 | B1 * | 2/2001 | Myers | E06B 1/6053 249/35 |
| 6,588,159 | B1 * | 7/2003 | Cotton, Jr. | E06B 1/6015 49/504 |
| 6,904,727 | B2 | 1/2005 | Edger | |
| 7,284,353 | B2 * | 10/2007 | Bealko | E06B 1/705 52/656.5 |
| 7,490,442 | B1 * | 2/2009 | Jackson | E06B 1/6053 52/214 |
| 7,587,868 | B2 * | 9/2009 | Hughes | E06B 1/02 52/745.15 |
| 7,849,657 | B2 | 12/2010 | Schnepf et al. | |
| 8,776,459 | B1 * | 7/2014 | Theophilus | E06B 3/667 52/204.7 |
| 9,080,373 | B2 * | 7/2015 | Silk | E06B 1/20 |
| 9,739,084 | B2 * | 8/2017 | Brooks, III | E06B 1/6038 |
| 10,309,146 | B1 * | 6/2019 | Rosende | E06B 1/02 |
| 10,450,790 | B1 * | 10/2019 | Luvison | E06B 1/62 |
| 10,538,952 | B2 * | 1/2020 | Rosende | E06B 1/68 |
| 10,808,451 | B2 * | 10/2020 | Pannunzio | E06B 3/263 |
| 2002/0011038 | A1 * | 1/2002 | Edger | E04G 15/02 52/656.5 |
| 2007/0125013 | A1 * | 6/2007 | Prince | E06B 1/04 52/204.1 |
| 2007/0204535 | A1 * | 9/2007 | Hughes | E06B 1/02 52/215 |
| 2009/0193728 | A1 * | 8/2009 | Butler | E06B 3/9628 52/745.15 |
| 2010/0287855 | A1 * | 11/2010 | Stephens | E06B 1/12 52/204.55 |
| 2017/0306687 | A1 | 10/2017 | Amothe | |
| 2019/0211611 | A1 * | 7/2019 | Hay, III | E06B 1/30 |
| 2022/0389751 | A1 * | 12/2022 | Gorman | E06B 1/6015 |

FOREIGN PATENT DOCUMENTS

| | | | |
|---|---|---|---|
| DE | 4419088 | A1 | 12/1995 |
| DE | 19754716 | A1 | 6/1998 |
| WO | 1990001200 | | 2/1990 |

* cited by examiner

FOUNDATION WINDOW ASSEMBLY AND METHOD FOR INSTALLING A FOUNDATION WINDOW FRAME INTO A FOUNDATION WALL

PRIOR APPLICATION

The present application claims priority from Canadian patent application CA 3 072 255, filed on Feb. 11, 2020, and entitled "FOUNDATION WINDOW ASSEMBLY AND METHOD FOR INSTALLING A FOUNDATION WINDOW FRAME INTO A FOUNDATION WALL", the disclosure of which being hereby incorporated by reference in its entirety.

TECHNICAL FIELD

The technical field relates to window assemblies, and more particularly to foundation window assemblies and to methods for installing foundation window assemblies.

BACKGROUND

Foundation walls might comprise a window opening with a window mounted therein. In some implementations, the windows are installed during the building of the foundation wall. It is thus very difficult to remove or replace the window without at least partially destroying the foundation wall.

In some cases, a wood frame is used to define the window opening while concrete is poured to build the foundation wall. Once the foundation wall is built, the wood frame is removed and replaced by a foundation window. However, the mounting of the foundation window into the window opening might be difficult and/or unstable.

In view of the above, there is a need for a foundation window assembly which would be able to overcome or at least minimize some of the above-discussed prior art concerns.

BRIEF SUMMARY

It is therefore an aim of the present invention to address the above-mentioned issues.

According to a first general aspect, there is provided a foundation window frame in combination with a foundation window casing integrable to a foundation wall, the foundation window casing comprising a plurality of casing members defining together a frame-receiving opening and at least one frame connector located on at least one of said plurality of casing members, the foundation window frame being at least partially insertable into the frame-receiving opening and comprising: a plurality of frame members defining together a window frame perimeter and having each a frame thickness, at least one of said plurality of frame members comprising an outer flange portion having an inner face and being engageable with at least one of said plurality of casing members; and at least one casing connector extending inwardly from the inner face of the outer flange portion of said at least one of said plurality of frame members along at least a portion of the frame thickness thereof, said at least one casing connector being removably engageable with said at least one frame connector.

In some embodiments, the casing connector extends inwardly along at least about 5% of the frame thickness of the corresponding frame member.

In some embodiments, at least one of said plurality of frame members comprises a window-supporting portion forming at least partially the window frame perimeter, and an outer flange portion projecting from said window-supporting portion and having an inner face, said at least one casing connector extending inwardly from the inner face.

In some embodiments, the outer flange portion has an outer face, and wherein the foundation window casing has an outer face configured to be substantially in a same plane as the outer face of the outer flange portion when the foundation window frame is at least partially inserted into the frame-receiving opening.

In some embodiments, said at least one casing connector comprises a male coupler.

In some embodiments, said at least one frame connector comprises a frame-engaging recess formed in at least one of the plurality of casing members and at least partially circumscribing the frame-receiving opening, said at least one of said at least one casing connector being at least partially removably engageable into the frame-engaging recess.

In some embodiments, said at least one casing connector and said at least one frame connector forms together a snap-fit connector assembly.

In some embodiments, said at least one casing connector comprises a plurality of spaced-apart casing connectors extending at least partially around the window frame perimeter.

In some embodiments, the foundation window casing has a casing thickness substantially equal to the frame thickness.

In some embodiments, the plurality of frame members comprise lower, upper and first and second side frame members, and the plurality of casing members comprise lower, upper and first and second side casing members removably engageable respectively with the lower, upper and first and second side frame members.

According to another general aspect, there is provided a foundation window frame in combination with a foundation window casing integrable to a foundation wall, the foundation window casing having an outer face and comprising a plurality of casing members defining together a frame-receiving opening and at least one frame connector arranged on at least one of said plurality of casing members, the foundation window frame being at least partially insertable into the frame-receiving opening and comprising: a plurality of frame members defining together a window screen-receiving opening, each one of said plurality of frame members being superposable against a respective one of said plurality of casing members; and at least one casing connector removably engageable with a respective one of said at least one frame connector. At least one of said plurality of frame members comprises a window-supporting portion bordering at least partially the window screen-receiving opening, and an outer flange portion projecting from said window-supporting portion and circumscribing at least partially the window screen-receiving opening, the outer flange portion having an outer face. The outer face of the outer flange portion is configured to be substantially in a same plane as the outer face of the foundation window casing when the foundation window frame is engaged therewith.

In some embodiments, at least one of said plurality of casing members defines a frame-abutting shoulder and comprises a casing flange portion having an outer face, and a frame-engaging portion at least partially delimiting the frame-abutting shoulder with the casing flange portion, wherein the casing flange portion at least partially surrounds the outer flange portion when the foundation window frame is engaged with the foundation window casing.

In some embodiments, said at least one casing connector is at least partially sandwiched between the outer flange portion and the frame-engaging portion when the foundation window frame is engaged with the foundation window casing.

In some embodiments, the plurality of frame members define together a window frame perimeter having a frame thickness, and wherein the outer flange portion has an inner face, said at least one casing connector extending inwardly from the inner face along at least a portion of the frame thickness.

In some embodiments, the foundation window casing has a casing thickness substantially equal to the frame thickness.

In some embodiments, said at least one casing connector comprises a plurality of spaced-apart casing connectors extending at least partially around the window frame perimeter.

In some embodiments, said at least one frame connector comprises a frame-engaging recess formed in the frame-engaging portion and at least partially circumscribing the frame-receiving opening, said at least one of said at least one casing connector being at least partially removably engageable into the frame-engaging recess.

In some embodiments, said at least one casing connector and said at least one frame connector form together a snap-fit connector assembly.

In some embodiments, the plurality of frame members comprises lower, upper and first and second side frame members, and the plurality of casing members comprises lower, upper and first and second side casing members removably engageable respectively with the lower, upper and first and second side frame members.

According to another general aspect, there is provided a foundation window assembly for a foundation wall, the foundation window assembly comprising a window casing integrable to the foundation wall upon building thereof, the window casing comprising: a plurality of casing members defining together a frame-receiving opening, wherein at least one of said plurality of casing members defines a frame-abutting shoulder and comprises: a casing flange portion having an outer face, and a frame-engaging portion at least partially delimiting the frame-abutting shoulder with the casing flange portion, and at least one frame connector located on the frame-engaging portion; and a window frame at least partially insertable into the frame-receiving opening and comprising: a plurality of frame members having an outer face and defining together a window screen-receiving opening, each one of said plurality of frame members being abuttable against a respective one of said plurality of casing members, and at least one casing connector located on at least one of said plurality of frame members and being removably engageable with a respective one of said at least one frame connector. The window frame is inserted into the frame-receiving opening, the outer face of said at least one of said plurality of frame members is substantially in a same plane as the outer face of the casing flange portion.

In some embodiments, said at least one frame connector comprises a frame-engaging recess formed in the frame-engaging portion and at least partially circumscribing the frame-receiving opening, at least one of said at least one casing connector being at least partially removably engageable into the frame-engaging recess.

In some embodiments, said at least one of said plurality of casing members defines two opposed frame-abutting shoulders.

In some embodiments, said at least one of said plurality of casing members comprises a substantially planar central portion extending between said two opposed frame-abutting shoulders.

In some embodiments, the plurality of frame members define together a window frame perimeter having a frame thickness, wherein at least one of said plurality of frame members comprises a window-supporting portion and an outer flange portion projecting from said window-supporting portion and having an outer face and an inner face, at least one of said at least one casing connector extending inwardly from the inner face along at least a portion of the frame thickness.

In some embodiments, the window casing has a casing thickness substantially equal to the frame thickness.

In some embodiments, said at least one of said at least one casing connector is at least partially sandwiched between the outer flange portion and the frame-engaging portion when the window frame is engaged with the window casing.

In some embodiments, the foundation window assembly has an outer face at least partially formed by the outer face of the casing flange portion and the outer face of the outer flange portion, and an opposed inner face, wherein said at least one of said plurality of casing members and said at least one of said plurality of frame members are spaced apart along at least a portion of the frame thickness when the window frame is inserted into the frame-receiving opening so as to define a tool-receiving aperture inbetween, the tool-receiving aperture opening into the inner face of the foundation window assembly.

In some embodiments, at least a portion of said at least one casing connector is arranged in the tool-receiving aperture.

In some embodiments, the plurality of frame members comprise lower, upper and first and second side frame members, and the plurality of casing members comprise lower, upper and first and second side casing members removably engageable respectively with the lower, upper and first and second side frame members.

In some embodiments, at least one of the window casing and the window frame is an extruded profile.

In some embodiments, said at least one casing connector and said at least one frame connector form together a snap-fit connector assembly.

According to another general aspect, there is provided a foundation window assembly for a foundation wall, the foundation window assembly comprising: a window frame comprising: a plurality of frame members, and at least one casing connector extending from at least one of said plurality of frame members; and a window casing integrable to the foundation wall upon building there-of, the window casing comprising: a plurality of casing members defining together a frame-receiving opening, wherein at least one of said plurality of casing members defines a frame-abutting shoulder and comprises: a casing flange portion, and a frame-engaging portion, wherein the casing flange portion and the frame-engaging portion at least partially delimit together the frame-abutting shoulder; wherein a frame-engaging recess is formed in the frame-engaging portion, the frame-engaging recess at least partially circumscribing the frame-receiving opening, said at least one casing connector being removably engageable into the frame-engaging recess when the window frame is inserted into the frame-receiving opening.

In some embodiments, said at least one of said plurality of casing members has a casing member length, the frame-engaging recess extending along at least a portion of the casing member length.

In some embodiments, said at least one of said plurality of casing members defines two opposed frame-abutting shoulders.

In some embodiments, said at least one of said plurality of casing members comprises a substantially planar central portion extending between said two opposed frame-abutting shoulders.

In some embodiments, the plurality of frame members define a window frame perimeter having a frame thickness, wherein said at least one casing connector extends inwardly along at least portion of the frame thickness and is removably engageable into the frame-engaging recess when the window frame is inserted into the frame-receiving opening.

In some embodiments, at least one of said plurality of frame members comprises a window-supporting portion forming at least partially the window frame perimeter, and an outer flange portion projecting from said window-supporting portion and having an inner face, said at least one casing connector extending inwardly from the inner face.

In some embodiments, the casing flange portion has an outer face and wherein the outer flange portion has an outer face configured to be substantially in a same plane as the outer face of the casing flange portion when the window frame is at least partially inserted into the frame-receiving opening.

In some embodiments, said at least one casing connector is at least partially sandwiched between the outer flange portion and the frame-engaging portion when the window frame is engaged with the window casing.

In some embodiments, the foundation window assembly has an outer face at least partially formed by the outer face of the casing flange portion and the outer face of the outer flange portion, and an opposed inner face, wherein said at least one of said plurality of casing members and said at least one of said plurality of frame members are spaced apart along at least a portion of the frame thickness so as to define a tool-receiving aperture inbetween, the tool-receiving aperture opening into the inner face of the foundation window assembly.

In some embodiments, at least a portion of said at least one casing connector is arranged in the tool-receiving aperture.

In some embodiments, the plurality of frame members comprises lower, upper and first and second side frame members, and the plurality of casing members comprises lower, upper and first and second side casing members removably engageable respectively with the lower, upper and first and second side frame members.

In some embodiments, the lower, upper and first and second side casing members comprise a frame-engaging portion with a frame-engaging recess formed therein, the frame-engaging recesses circumscribing substantially entirely the frame-receiving opening.

In some embodiments, at least one of the window casing and the window frame is an extruded profile.

In some embodiments, said at least one casing connector and said at least one frame connector form together a snap-fit connector assembly.

According to another general aspect, there is provided a method for installing a foundation window frame into a foundation wall, the method comprising: forming a foundation wall formwork including wall panels defining a spacing inbetween; positioning a foundation window casing at a predetermined position be-tween the wall panels; securing the positioned foundation window casing to the foundation wall formwork, the foundation wall casing comprising a plurality of casing members defining together a frame-receiving opening and at least one frame connector located on at least one of said plurality of casing members; pouring concrete in the spacing defined between the wall panels to at least partially surround the foundation window casing; inserting a foundation window frame in the frame-receiving opening, the foundation window frame comprising a plurality of frame members having each a frame thickness and defining together a window frame perimeter, at least one of said plurality of frame members comprising an outer flange portion having an inner face, the foundation window frame comprising at least one casing connect-or extending inwardly from the inner face of the outer flange portion of said at least one of said plurality of frame members along at least a portion of the frame thickness thereof; and engaging at least partially the foundation window frame with the foundation window casing by removably engaging said at least one casing connector with said at least one frame connector.

In some embodiments, the step of inserting the foundation window frame in the frame-receiving opening is realized after the step of positioning the foundation window casing at the predetermined position.

In some embodiments, the step of inserting the foundation window frame in the frame-receiving opening is realized from an outside of the foundation wall.

In some embodiments, the foundation wall has an outer surface and the foundation window frame has an outer face and wherein the step of engaging the foundation window frame with the foundation window casing is realized until the outer face of the foundation window frame is substantially in a same plane as the outer surface of the foundation wall.

DETAILED DESCRIPTION

Figure 1:
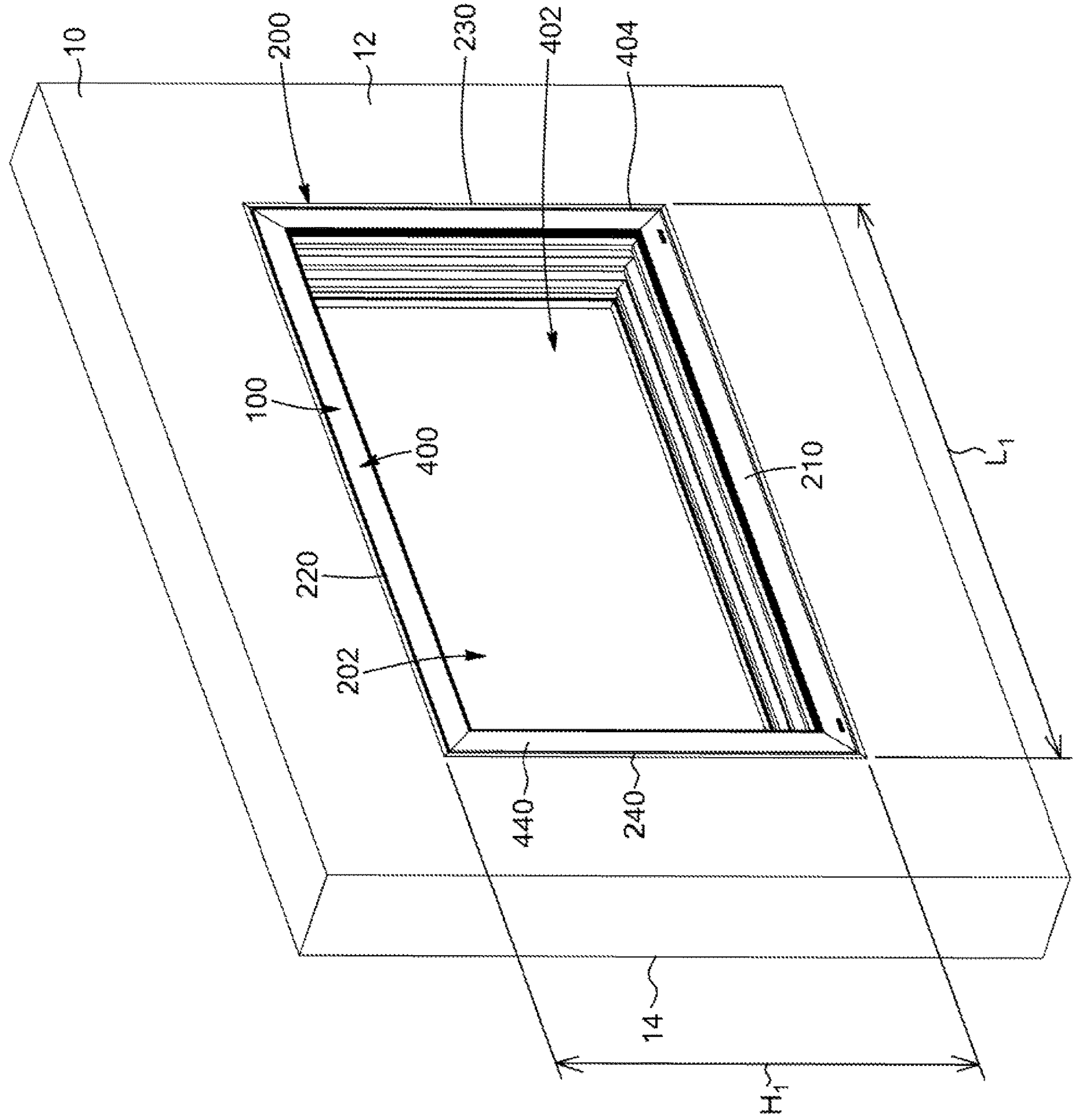
FIG. 1 is an outer perspective view of a foundation wall with a foundation window assembly according to an embodiment enclosed therein, the foundation window assembly comprising a window casing and a window frame engaged therewith.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the foundation window assembly and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Referring now to the drawings, and more particularly to FIGS. 1 to 3, 11 and 12, there is shown a foundation window assembly 100 that is configured to be integrated into a foundation wall 10. As detailed below, the foundation window assembly 100 is configured to form a window opening into the foundation wall 10.

In the embodiment shown, the foundation wall 10 is at least partially made of concrete or any other suitable material and comprises an outer surface 12 and an opposed inner surface 14. For instance, the foundation wall 10 forms at least partially a foundation portion of a building, such as a house, and at least partially defines a basement of the building. The basement is thus at least partially delimited, directly or indirectly, by the inner surface 14 of the foundation wall 10. It is understood that the present disclosure is not limited to a window assembly that is shaped and dimensioned to form a window opening into a basement wall and can be integrated into any other type of wall portion.

In the following description, unless otherwise specified, the terms inner and outer (or inward, inwardly, outward, outwardly) should be understood with respect to the building into the foundation wall of which the foundation window assembly 100 is integrated.

The foundation window assembly 100 first comprises a foundation window casing 200 (or window casing 200) integrable to the foundation wall 10 upon building thereof. The window casing 200 comprises a plurality of casing members 210, 220, 230, 240 defining together a frame-receiving opening 202, and one or more frame connectors 250 (FIG. 4) located (or arranged) on at least one of the plurality of casing members 210, 220, 230, 240.

The foundation window assembly 100 further comprises a foundation window frame 400 (or window frame 400) at least partially insertable into the frame-receiving opening 202 of the foundation window casing 200 and comprising a plurality of frame members 410, 420, 430, 440 defining together a window screen-receiving opening 402. In the embodiment shown, each frame member is abuttable (or superposable) against a respective one of the plurality of casing members. The foundation window frame 400 further comprises one or more casing connectors 450 (FIG. 7) located on (or arranged on) at least one of the plurality of frame members 410, 420, 430, 440 and being removably engageable with a respective one of the frame connectors 250.

As detailed below, the foundation window assembly 100 is thus shaped and dimensioned so that the window frame 400 can be removably engaged with the window casing 200, inwardly thereof.

Foundation Window Casing (Foundation Window Base or Buck)

In the embodiment shown, the window casing 200 (or window base 200, or window buck 200) has a substantially rectangular shape. In other words, the window casing 200 has a length L1 and a height H1 (FIG. 1). In the following description, unless otherwise specified, the length L1 and the height H1 will equally refer to the window casing 200 or the foundation window assembly 100. It is understood that the window frame 400 has dimensions slightly smaller than the dimensions of the window casing 200, for the window frame 400 to be engageable with the window casing 200.

The plurality of above-mentioned casing members comprises lower and upper casing members 210, 220 substantially parallel to each other. The casing members further comprise first and second side casing members 230, 240 substantially parallel to each other and extending between the lower and upper casing members 210, 220. In the embodiment shown, the first and second side casing members 230, 240 are substantially perpendicular to the lower and upper casing members 210, 220.

Figure 4:
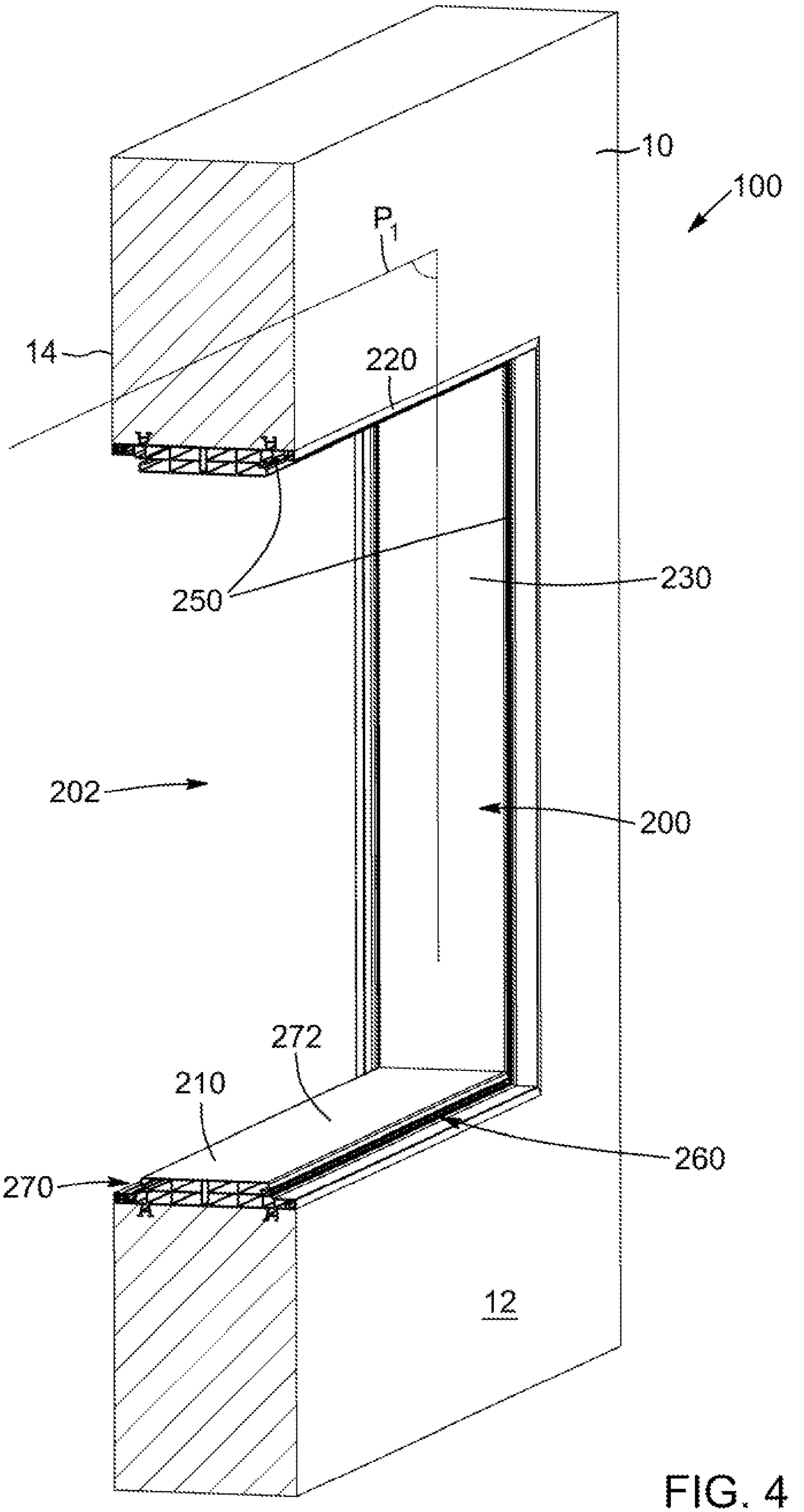
FIG. 4 is an outer perspective view, sectioned, of the foundation wall and the foundation window assembly of FIG. 1, without a window frame engaged with the window casing.

In the embodiment shown, as shown for instance in FIG. 4, the foundation window casing 200 has two substantially vertical symmetry planes, perpendicular to each other. A first vertical plane of symmetry P1 is substantially parallel to the outer surface 12 of the foundation wall 10 when the window casing 200 is integrated thereinto. A second vertical plane of symmetry (not represented) extends substantially perpendicularly to the first vertical plane of symmetry P1 or to the outer surface 12 of the foundation wall 10 when the window casing 200 is integrated thereinto. The intersection of the first and second planes of symmetry is a vertical middle axis of the foundation window casing 200.

In the embodiment shown, the lower, upper and first and second side casing members 210, 220, 230, 240 have a substantially similar shape, so that the following description of the lower casing member 210 will apply to any of them.

Figure 5:
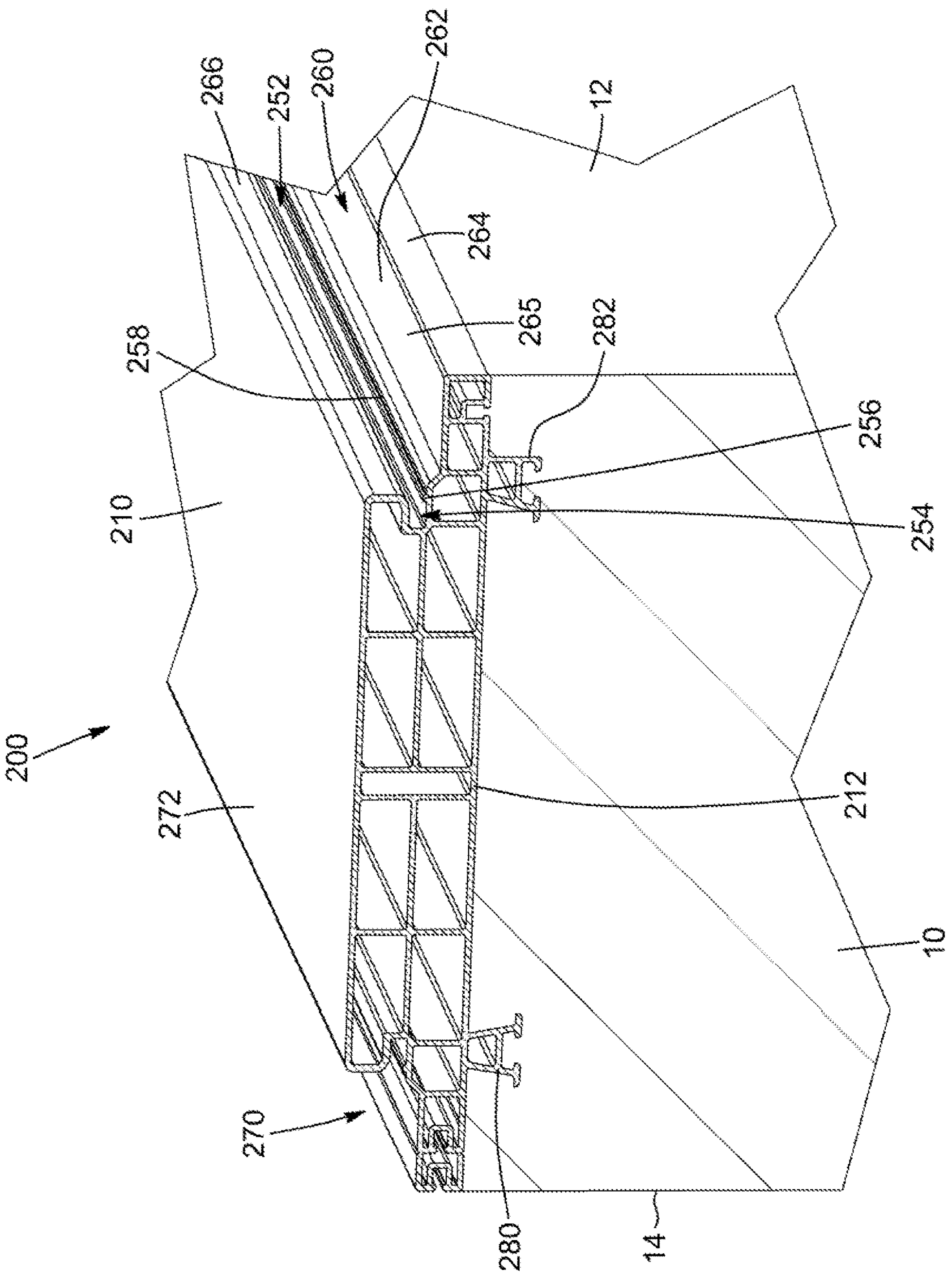
FIG. 5 is an enlarged view of a segment of the foundation wall and the window casing of FIG. 4.

As represented for instance in FIG. 5, the lower casing member 210 defines an outer frame-abutting shoulder 260 and comprises a casing flange portion 262 having an outer face 264, extending substantially vertically in the embodiment shown, and a frame-supporting face 265 extending substantially horizontally in the embodiment shown. The lower casing member 210 further comprises a frame-engaging portion 266 at least partially delimiting with the casing flange portion 262 (with the frame-supporting face 265 thereof, in the embodiment shown) the outer frame-abutting shoulder 260.

In the embodiment shown, the outer face 264 of the casing flange portion 262 is substantially in a same plane as the outer surface 12 of the foundation wall 10 when integrated thereinto. The outer face 264 forms at least partially an outer face of the lower casing member 210, so that in the following description, unless otherwise specified, the outer face will equally refer to the casing flange portion, to the lower casing member (or to any other casing member) or to the foundation window casing 200.

In the embodiment shown, the outer frame-abutting shoulder 260 extends along at least a portion of the length L1 (FIG. 1) of the lower casing member 210. In some embodiments, the outer-frame-abutting shoulder 260 extends substantially along a length slightly smaller than the length L1 of the lower casing member 210. In the embodiment shown, the lower casing member 210 has a casing member length corresponding substantially to the length L1 of the window casing 200 (and to a casing member length of the upper casing member 220), whereas a length of the first and second side casing members 230, 240 correspond substantially to the height H1 of the window casing 200. The same applies for the frame members 410, 420, 430, 440.

In the embodiment shown, the frame connectors 250 comprise a lower frame connector 252 arranged on the lower casing member 210, for instance located on the frame-engaging portion 266 thereof.

For instance, the lower frame connector 252 comprises a frame-engaging recess 254 formed in the frame-engaging portion 266. In the embodiment shown, the frame-engaging recess 254 extends substantially horizontally along at least a portion of the length L1 of the lower casing member 210 (or lower casing member length). In some embodiments, a length of the frame-engaging recess 254 is at least slightly smaller than the lower casing member length. In other words, the frame-engaging recess 254 at least partially circumscribes the frame-receiving opening 202. In the embodiment wherein the lower, upper and first and second side casing members 210, 220, 230, 240 all comprise a frame connector having a frame-engaging recess formed therein, the frame-engaging recess substantially circumscribes the frame-receiving opening 202.

It is thus understood that the frame-engaging recess 254 forms a female coupler extending at least partially around the frame-receiving opening 202. As best shown in FIG. 5, a hook retainer 256, in the shape of a protruding lip, extends inwardly, i.e. inside the frame-engaging recess 254, from a lower surface 258 at least partially delimiting the frame-engaging recess 254. It is appreciated that, in an alternative embodiment (not shown), the hook retainer 256 could protrude from an upper surface delimitating the frame-engaging recess 254. As further detailed below, the frame-engaging recess 254 is shaped and dimensioned so that at least one of the casing connectors 450 is removably engageable thereinto when the window frame 400 is inserted into the frame-receiving opening 202 defined by the foundation window casing 200.

In the embodiment shown, similar frame-engaging recesses are formed in the upper and first and second side casing members 220, 230, 240 so that the different frame-engaging recesses circumscribe substantially an entirety of the frame-receiving opening 202.

In the embodiment shown, the lower casing member 210 also defines an inner frame-abutting shoulder 270 similar to the outer frame-abutting shoulder 260. In other words, the lower casing member 210 comprises two opposed frame-abutting shoulders 260, 270 with a central portion 272 (substantially planar, in the embodiment shown) extending therebetween. In the embodiment shown, the central portion 272 protrudes inwardly, i.e. into the frame-receiving opening 202, with respect to the frame-abutting shoulders 260, 270.

As represented in FIG. 5, the lower casing member 210 further comprises foundation wall-anchoring portions 280, 282 protruding outwardly from an outer surface 212 of the casing member 210, 220, 230, 240. In the embodiment shown for the lower casing member 210, the foundation wall-anchoring portions 280, 282 protrude downwardly from the lower and outer surface 212 of the lower casing member 210. The foundation wall-anchoring portions 280,

282 are shaped and dimensioned to increase the engagement of the lower casing member 210 with the material (for instance concrete) at least partially forming the foundation wall 10 upon building thereof.

In the embodiment shown, the lower casing member 210 is an extruded profile and comprises a plurality of hollow sections extending at least along a portion of the length L1 of the lower casing member 210 and connected to each other.

It is appreciated that the shape and the configuration of the lower casing member 210, the shape, the configuration and the location of the frame-abutting shoulders 270, 260, the frame-engaging recess 254 and the lower frame connector 252 thereof can vary from the embodiment shown. Moreover, it could be conceived a lower casing member having no inner frame-abutting shoulder or having inner and outer frame-abutting shoulders having different shapes and/or dimensions. Moreover, even though in the embodiment shown, the lower, upper and first and second side casing members have a substantially similar shape and have substantially similar frame connectors, it could be conceived a window casing having casing members with different frame connectors, and/or wherein only some of the lower, upper and first and second side casing members would comprise frame connectors.

Foundation Window Frame

Figure 6:
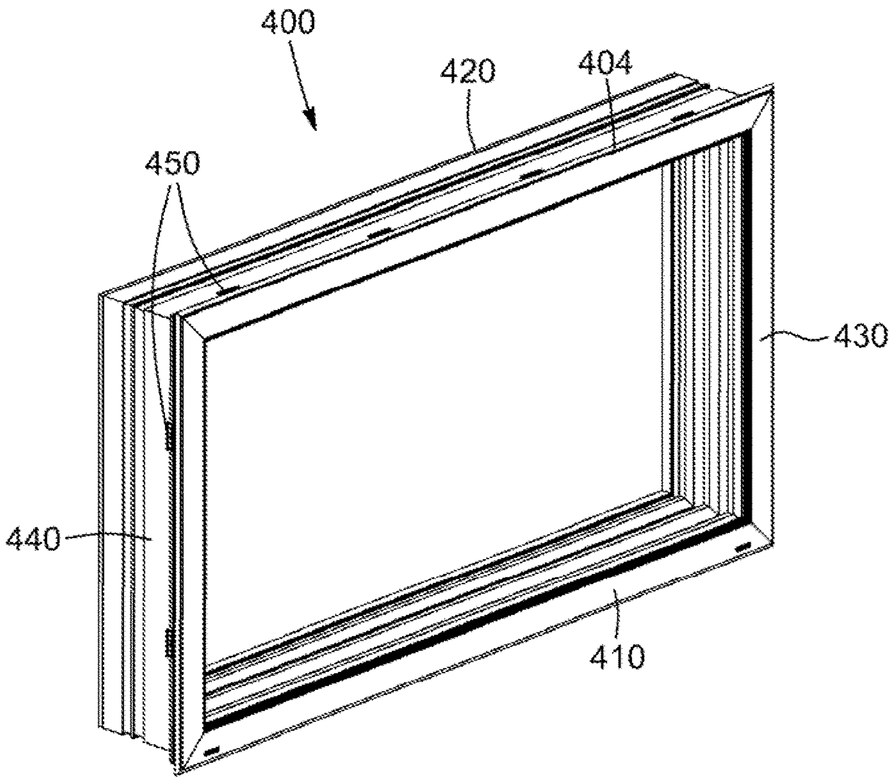
FIG. 6 is an outer top perspective view of the window frame of FIG. 1, a plurality of casing connectors being arranged on the window frame.
Figure 7:
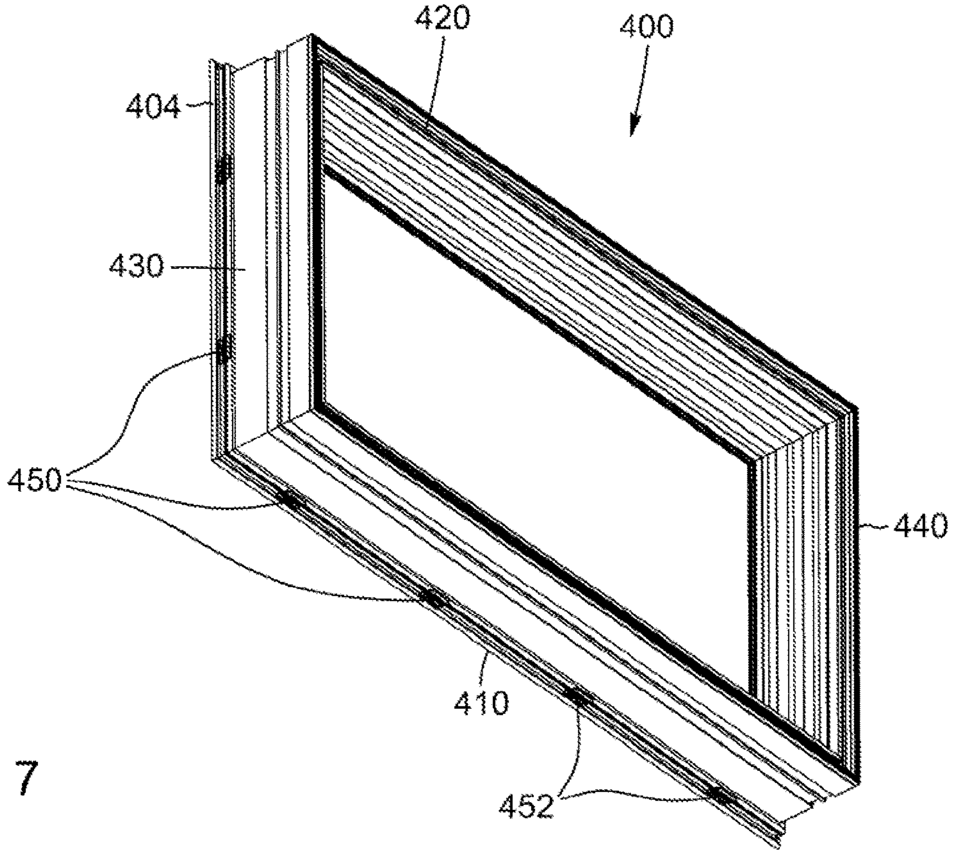
FIG. 7 is an inner bottom perspective view of the window frame of FIG. 6.

As represented for instance in FIGS. 6 and 7, in the embodiment shown, the window frame 400 has a substantially rectangular shape. The plurality of frame members of the window frame 400 comprises a lower frame member 410 and an upper frame member 420 substantially parallel to each other. The frame members further comprise first and second side frame members 430, 440 substantially parallel to each other and extending between the lower and upper frame members 410, 420. In the embodiment shown, the first and second side frame members 430, 440 are substantially perpendicular to the lower and upper frame members 410, 420.

Figure 8:
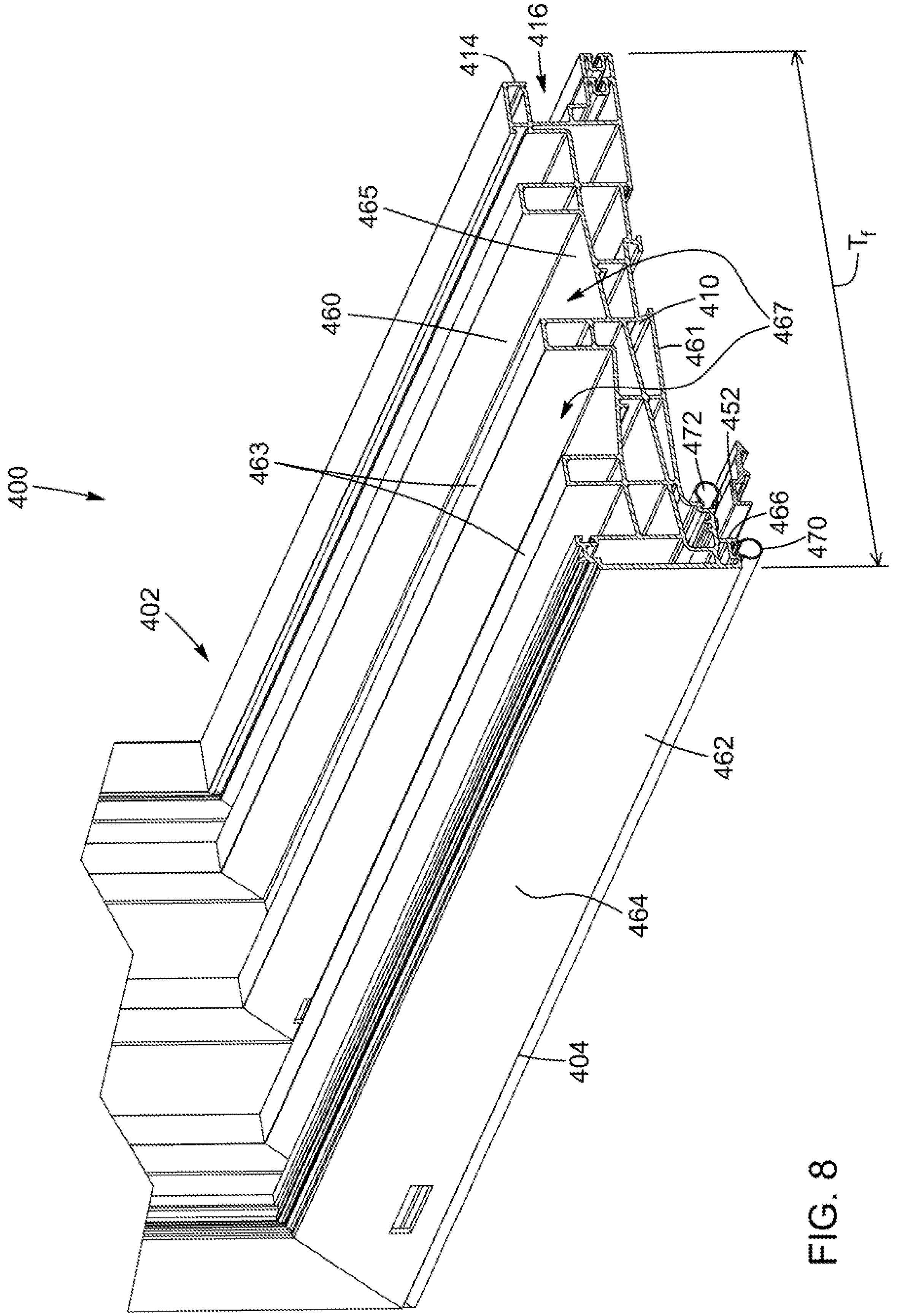
FIG. 8 is an enlarged outer perspective view, sectioned, of a segment of the window frame of FIG. 6.

The frame members 410, 420, 430, 440 delimit together a window frame perimeter 404 (or outer frame perimeter) and the window frame 400 has a frame thickness Tf (FIG. 8). In the embodiment shown, the frame thickness Tf of the window frame 400 corresponds substantially to a frame thickness of the different frame members 410, 420, 430, 440. The outer frame perimeter 404 of the window frame 400 is substantially equal to an inner frame perimeter of the foundation window casing 200 delimiting the frame-receiving opening 202 to be abuttable and engageable together.

In the embodiment shown, the lower, upper and first and second side frame members 410, 420, 430, 440 have a substantially similar shape, so that the following description of the lower frame member 410 will apply to any of them.

As best shown in FIG. 8, the lower frame member 410 comprises a window-supporting portion 460 bordering at least partially the window screen-receiving opening 402, and an outer flange portion 462 (or sealing frame portion 462) projecting outwardly from the window-supporting portion 460 in a substantially vertical direction. The outer flange portion 462 extends at least partially around the window screen-receiving opening 402 and has an outer face 464. In other words, the outer flange portion 462 projects perpendicularly from the window-supporting portion 460. In the embodiment shown, as represented for instance in FIG. 3, the outer face 464 of the outer flange portion 462 is substantially in a same plane as the outer surface 12 of the foundation wall 10 when integrated thereinto. The outer face 464 forms at least partially an outer face of the lower frame member 410, so that in the following description, unless otherwise specified, the outer face 464 will equally refer to the outer flange portion, to the lower frame member (or to any other frame member) or to the foundation window frame 400.

The outer flange portion 462, as represented for instance in FIG. 8, comprises an inner face 466 opposed to the outer face 464 and extending substantially parallel thereto, in the embodiment shown. In the embodiment shown, the casing connectors 450 comprise a plurality of lower casing connectors 452 provided on the lower frame member 410, for instance extending from the outer flange portion 462 thereof (from the inner face 466 thereof, in the embodiment shown).

As represented in FIG. 8, the lower casing connector 452 extends inwardly (i.e. towards the inner surface 14 of the foundation wall 10 when integrated thereinto or towards a center of the casing connector 452) along at least portion of the frame thickness Tf. In some embodiments, the lower casing connector 452 extends inwardly along at least about 5% of the frame thickness Tf. In some other embodiments, the lower casing connector 452 extends inwardly along at least about 10% of the frame thickness Tf.

In the embodiment shown, as represented in FIG. 7, each of the plurality of the lower casing connectors 452 extends substantially horizontally along at least a portion of the length of the lower frame member 410. In the embodiment wherein all the frame members 410, 420, 430, 440 comprise one or more casing connectors, the plurality of the casing connectors circumscribe the window screen-receiving opening 402. In yet other words, in the embodiment wherein all the frame members 410, 420, 430, 440 comprise one or more casing connectors, the plurality of the casing connectors extend at least partially around the window frame perimeter 404.

In the embodiment shown, the casing connector 450 comprises a plurality of spaced-apart lower casing connector segments, i.e. the lower casing connector 452 does not extend continuously along the lower frame member 410 but comprises a plurality of spaced-apart connector segments. It could also be conceived a lower frame member 410 that would comprise one single lower casing connector extending along at least a portion of the length of the lower frame member 410 (or along substantially an entirety of the length of the lower frame member 410).

As represented in FIG. 8, the lower casing connector 452 extends inwardly slightly below the outer flange portion 462 of the window-supporting portion 460, for instance at a distance from a peripheral outer surface 461 of the window-supporting portion 460, i.e. the lower surface for the lower frame member 410. In the embodiment shown, the window-supporting portion 460 comprises a plurality of window-separating wall portions 463 protruding upwardly from a peripheral inner surface 465 thereof, i.e. the upper surface for the lower frame member 410, so as to form window panel-receiving cavities 467 inbetween.

Figure 10:
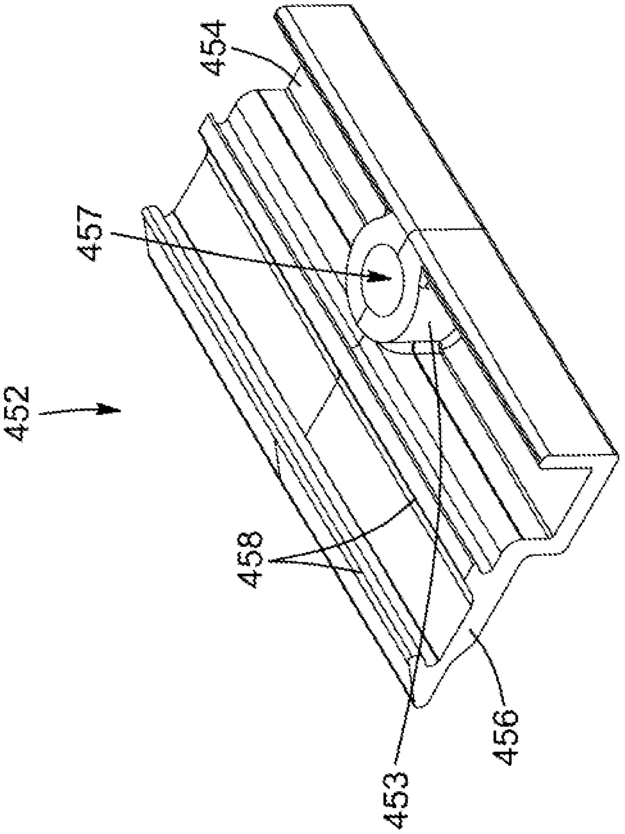
FIGS. 9 and 10 are respective top and bottom perspective views of one of the casing connectors of FIG. 6.
Figure 9:
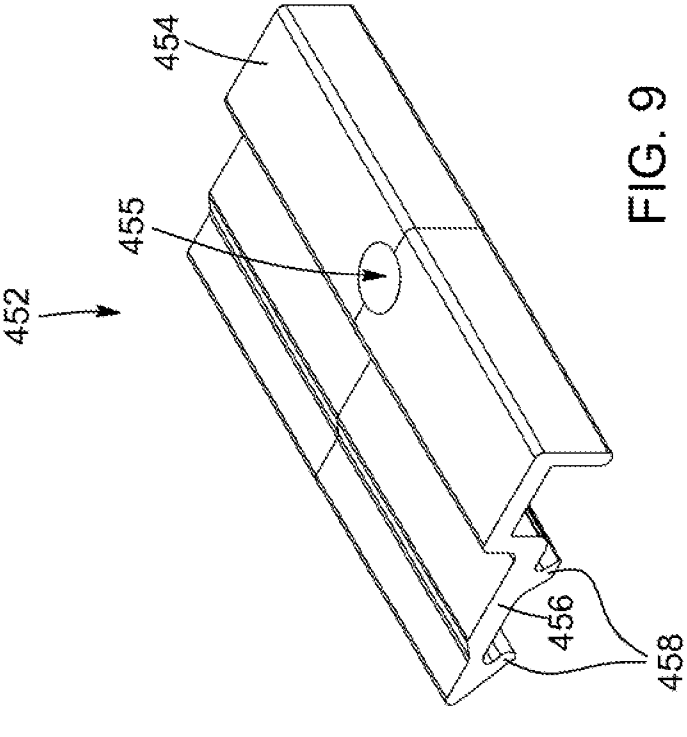

It is thus understood that the casing connector 452 forms a male coupler extending at least partially around the window screen-receiving opening 402 (i.e. at least partially along the window frame perimeter 404). As best shown in FIGS. 9 and 10, the lower casing connector 452 comprises a frame member-mounting portion 454 securable to the lower frame member 410 (for instance to the window-supporting portion 460 thereof, for instance via mechanical fasteners—not represented—engaged into a fastener-receiving aperture 455 formed in the frame member-mounting portion 454) and a casing-connecting portion 456 removably engageable with a corresponding frame connector 250. In the embodiment shown, the casing connector 452 comprises a fastener-guiding sleeve 453 protruding from a face of the frame member-mounting portion 454, with a fastener-receiving cavity 457 formed therein, which is in register with the fastener-receiving aperture 455. The fastener-guiding sleeve 453 is shaped and dimensioned to guide and maintain a mechanical fastener while securing the casing connector 452 to the lower frame member 410; for instance, a head of the mechanical fastener abuts the fastener-guiding sleeve 453 when at least partially engaged in the fastener-receiving cavity 457 (i.e. the fastener-guiding sleeve 453 is sandwiched between the head of the mechanical fastener and the lower frame member when the casing connector is secured thereto).

In the embodiment shown, the casing-connecting portion 456 further comprises connecting hooks 458 shaped and dimensioned for the casing-connecting portion 456 to be at least partially engageable and retained into the frame-engaging recess 254, for instance via the above-described hook retainer 256.

It is thus understood that the frame connectors 250 and the casing connectors 450 form together snap-fit connector assemblies (cantilever snap-fit connector assemblies, in the embodiment shown). The present disclosure is not limited to the disclosed snap-fit connector assemblies and any other mechanical fasteners shaped and dimensioned to provide a removable engagement of the window frame 400 and the window casing 200 could be conceived.

The lower frame member 410 further comprises an inner face 414 with a windowsill-receiving cavity 416 formed therein.

In the embodiment shown, the lower frame member 410 further comprises one or more window sealing members 470, 472 (or insulation or weather strip seals) (two, in the embodiment shown) arranged for instance on the outer flange portion 462 thereof. For instance, the lower casing connector 452 is at least partially arranged between the window sealing members 470, 472.

Figure 3:
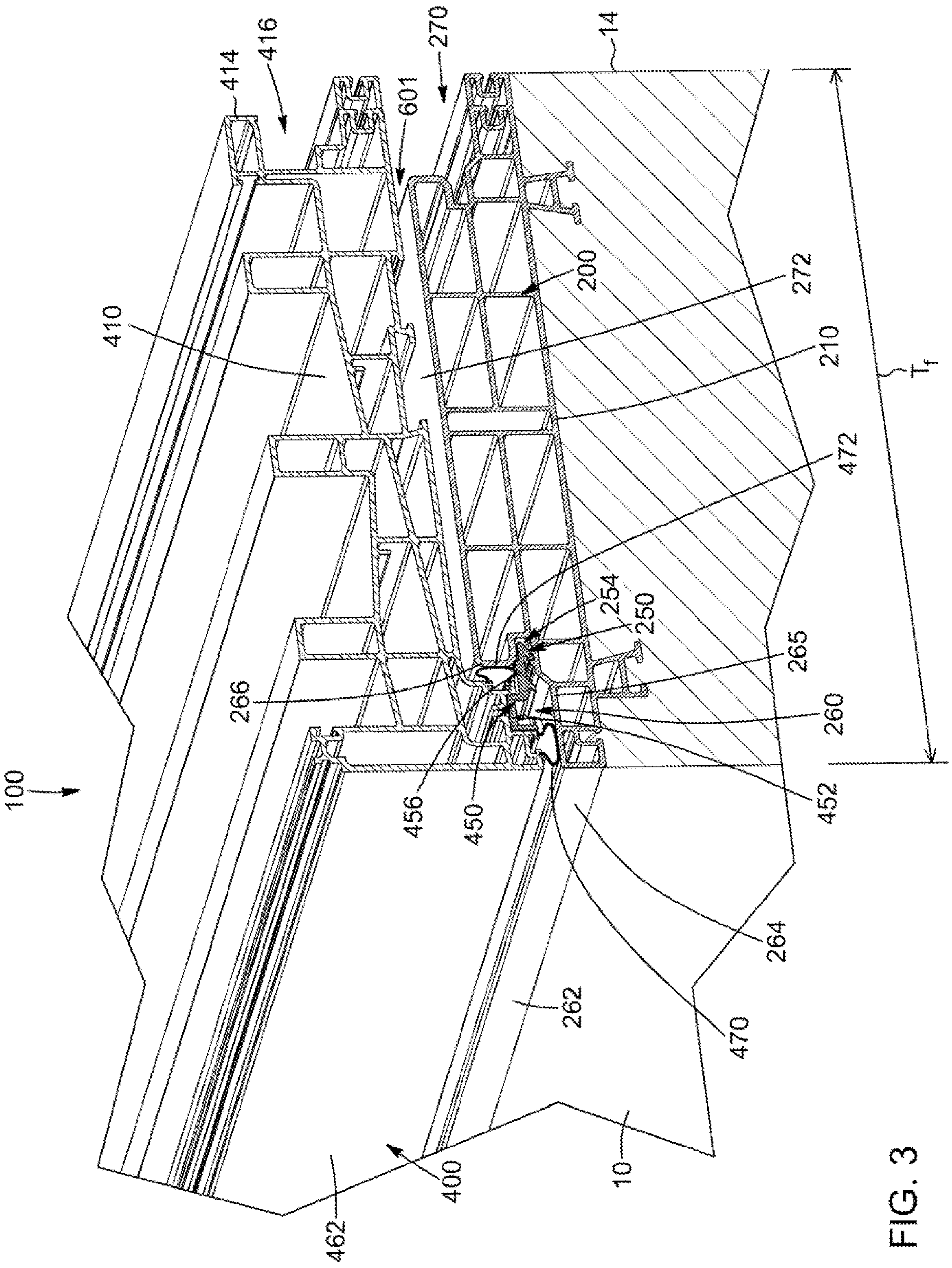
FIG. 3 is an enlarged view of a segment of the foundation wall and the foundation window assembly of FIG. 2.

In the embodiment shown, as represented in FIG. 3, the frame thickness Tf is substantially equal to a casing thickness and is substantially equal to a foundation wall thickness, defined between the outer and inner surfaces 12, 14 of the foundation wall 10.

In the embodiment shown, the lower frame member 410 is an extruded profile and comprises a plurality of hollow sections extending at least along a portion of the length of the lower frame member 410 and connected to each other.

It is appreciated that the shape and the configuration of the lower frame member 410, the shape, the configuration and the location of the window-supporting portion, the outer flange portion and the lower casing connectors thereof, can vary from the embodiment shown.

Figure 14:
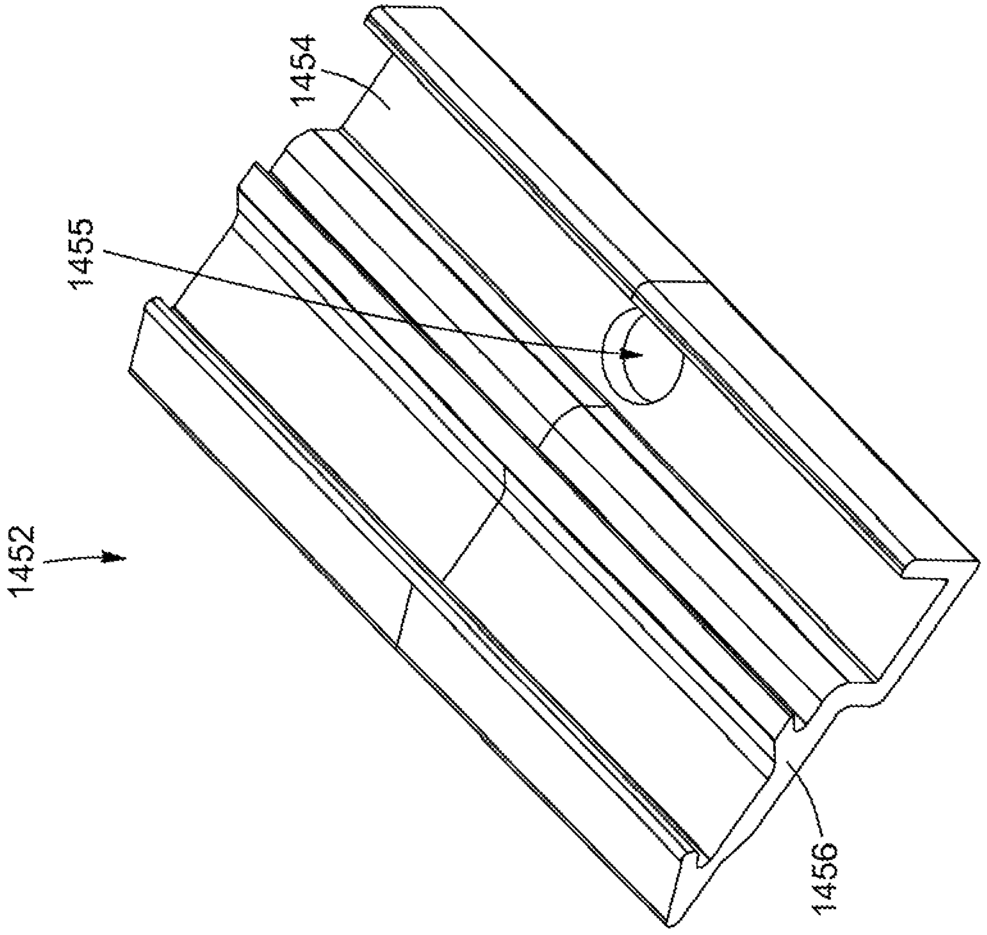
FIG. 14 is a bottom perspective view of a casing connector in accordance with another embodiment.

For instance, as represented in FIG. 14, it could be conceived a casing connector 1452 having a casing-connecting portion 1456 and a frame member-mounting portion 1454 with a fastener-receiving aperture 1455 formed therein, the casing connector 1452 having no fastener-guiding sleeve protruding from a face of the frame member-mounting portion 1454.

Figure 16:
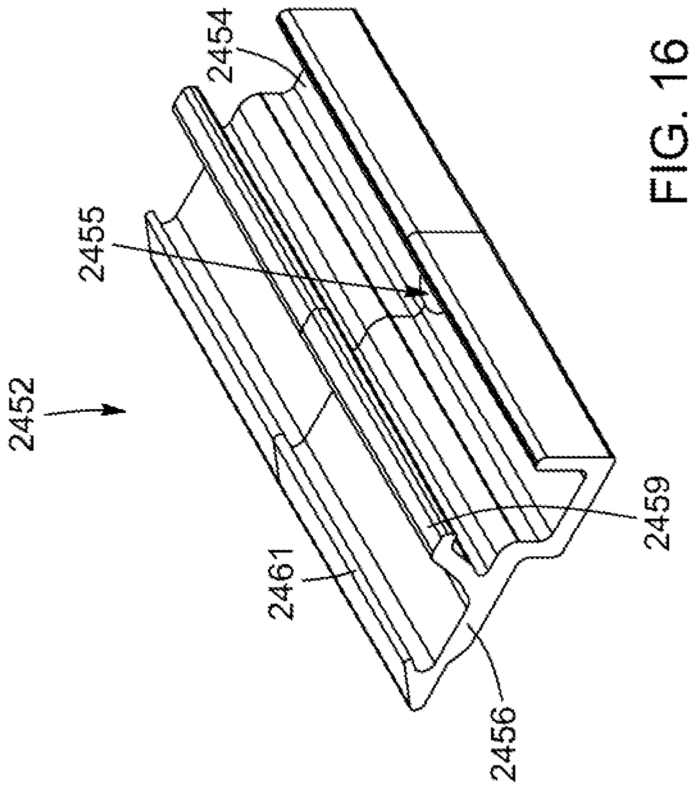
FIGS. 15 and 16 are respective top and bottom perspective views of a casing connector in accordance with another embodiment.
Figure 15:
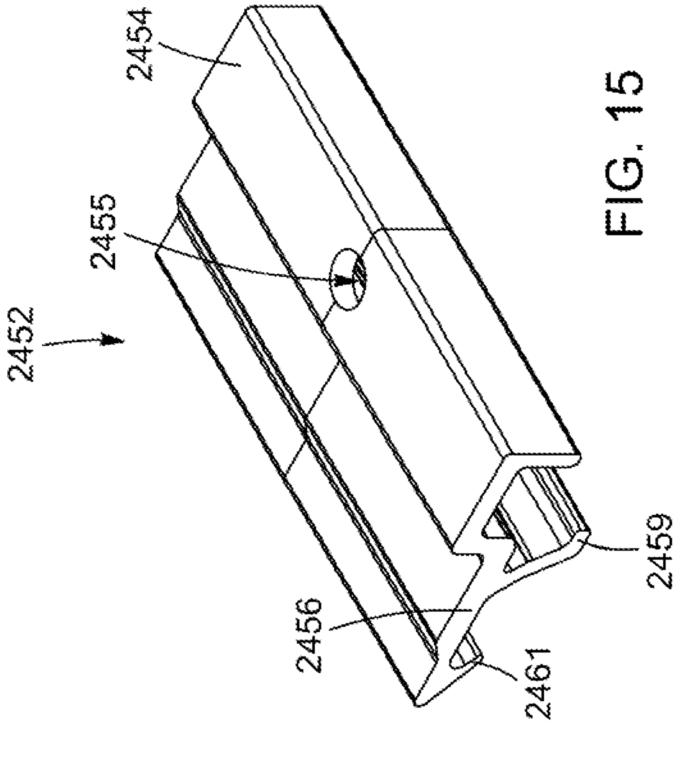

As represented in FIGS. 15 and 16, it could also be conceived a casing connector 2452 having a casing-connecting portion 2456 and a frame member-mounting portion 2454 with a fastener-receiving aperture 2455 formed therein. In the embodiment shown, the casing-connecting portion 2456 comprises two connecting hooks 2459, 2461 (i.e. a proximal—with respect to the frame member-mounting portion 2454—or outer connecting hook 2459 and a distal or inner connecting hook 2461) shaped and dimensioned for the casing-connecting portion 2456 to be at least partially removably engageable and retained into the frame-engaging recess. In the embodiment shown, the proximal connecting hook 2459 has greater dimensions—for instance a greater length—than the distal connecting hook 2461. In the embodiment shown, the proximal connecting hook 2459 comprises two portions substantially inclined relative to each other. The casing connector 2452, in particular via the two connecting hooks 2459, 2461 of its casing-connecting portion 2456, is thus shaped and dimensioned to safely and removably engage a corresponding one of the frame connectors.

Moreover, even though in the embodiment shown, the lower, upper and first and second side frame members have a substantially similar shape and have substantially similar casing connectors, it could be conceived a foundation frame having frame members with different casing connectors, and/or wherein only some of the lower, upper and first and second side frame members would comprise casing connectors.

Relative Arrangement of the Window Frame and the Window Casing

Figure 2:
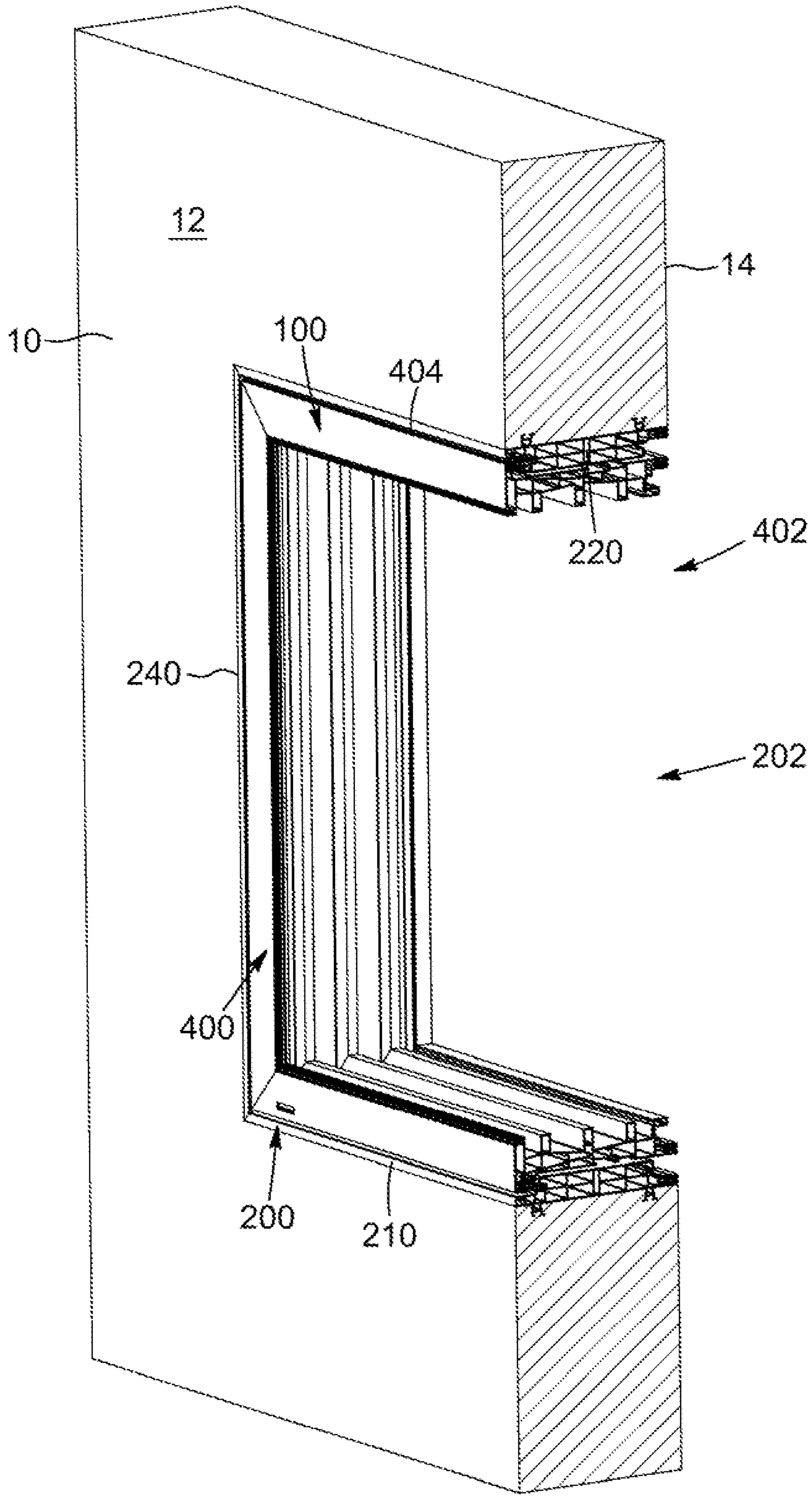
FIG. 2 is an outer perspective view, sectioned, of the foundation wall and the foundation window assembly of FIG. 1.

As represented for instance in FIGS. 1 to 3, the foundation window assembly 100 is shaped and dimensioned so that the frame members are superposable inwardly against a respective one of the casing members (i.e. so that the lower, upper and first and second side frame members 410, 420, 430, 440 are respectively superposable against the lower, upper and first and second side casing members 210, 220, 230, 240).

Moreover, as detailed above, due to the arrangement of the casing connectors 450 and the frame connectors 250 respectively on the different frame members 410, 420, 430, 440 and casing members 210, 220, 230, 240, at least one of the frame members is removably engageable with at least one of the casing members. In the embodiment shown, the lower, upper and first and second side frame members 410, 420, 430, 440 are respectively removably engageable with the lower, upper and first and second side casing members 210, 220, 230, 240.

As detailed above, the casing and frame connectors 450, 250 are shaped and dimensioned so that each casing connector 450 is removably engageable with a respective frame connector 250. The expression "removably engageable with" should be understood, in the present disclosure, as meaning that the window frame 400 can be removed from the window casing 200 (i.e. disengaged therefrom) without substantially damaging any of the window frame 400, the window casing 200 and the foundation wall 10 (i.e. so that the same or another window frame can then be engaged therewith, possibly by replacing at least one of the frame and casing connectors).

As mentioned above, and as best represented for instance in FIGS. 1 to 3, the foundation window assembly 100 is shaped and dimensioned to that the outer face of one or more of the frame members (for instance the outer face of the outer flange portion 462 thereof) is configured to be substantially in a same plane as the outer face of the foundation window casing 200 (for instance the outer face of the casing flange portion 262 thereof) when the foundation window frame 400 is engaged therewith. In other words, when the window frame 400 is inserted into the frame-receiving opening 202 of the foundation window casing 200, the outer face of one or more frame members is configured to be substantially in a same plane as the outer face of the casing flange portion 262 of the corresponding casing member. It is thus understood that the foundation window assembly has an outer face that is at least partially formed by the outer face of the casing flange portion 262 and the outer face of the outer flange portion 462. The foundation window assembly 100 comprises an opposed inner face, formed at least partially by the inner faces of the window frame 400 and the window casing 200.

When the window frame 400 is at least partially inserted into the frame-receiving opening 202 of the foundation window casing 200, and as represented in FIG. 1, the casing members 210, 220, 230, 240 surround the foundation window frame 400.

It is thus understood that the foundation window assembly 100 according to the present disclosure is configured to ease the installation and the removal of the window frame 400 with respect to the window casing 200. The window frame 400 can thus be replaced without having to remove the window casing, and thus without having to partially destroy the foundation wall 10. Moreover, due to the arrangement of the frame and casing connectors, once the window frame 400 is engaged with the window casing 200, the casing connectors are not reachable or visible from an outside of the foundation window assembly 100 (i.e. from the outer face thereof). Moreover, it is understood that the foundation window casing 200 forms an interface between the window frame 400 and the foundation wall 10. In other words, there is no direct coupling cooperation between the window frame 400 and the foundation wall 10.

Additional Components of the Foundation Window Assembly

As detailed above, the foundation window frame 400 and the foundation window casing 200 form together at least partially the foundation window assembly 100.

Figure 11:
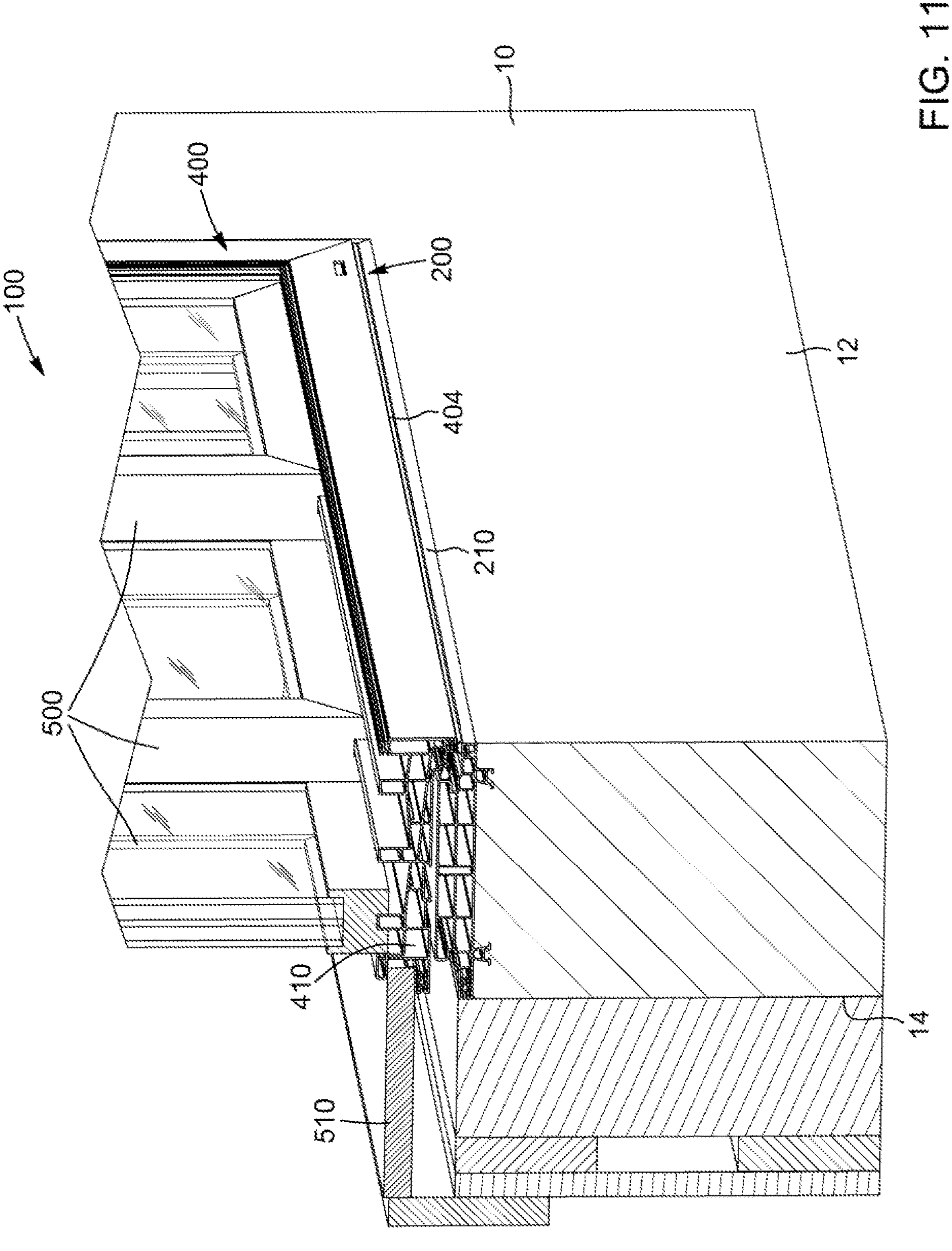
FIG. 11 is an outer perspective view, sectioned, of a lower section of the foundation wall and the foundation window assembly of FIG. 1, the foundation window assembly further comprising a windowsill and window panels engaged with the window frame.
Figure 12:
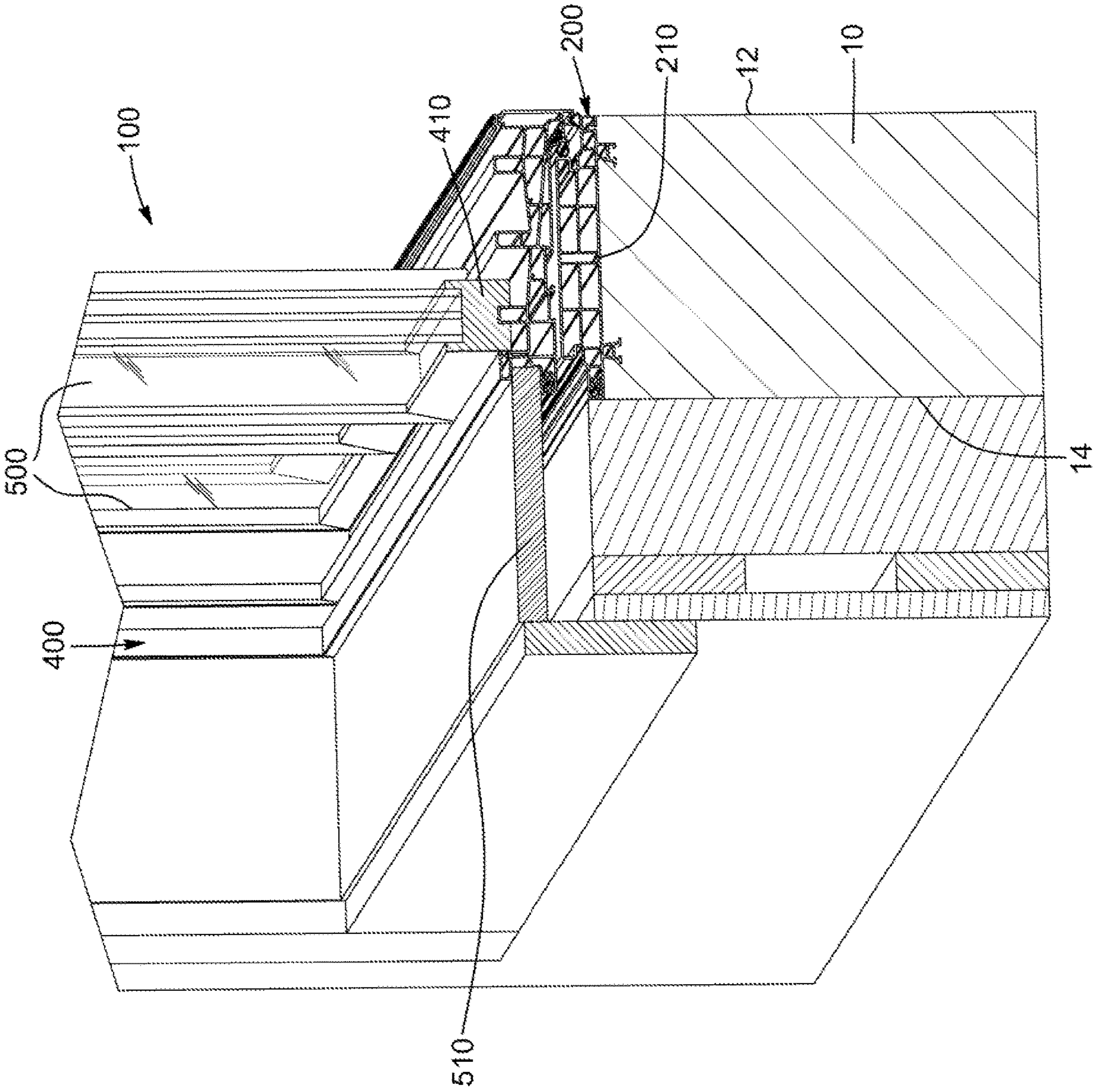
FIG. 12 is an inner perspective view, sectioned, of the lower section of the foundation wall and the foundation window assembly of FIG. 11.
Figure 13:
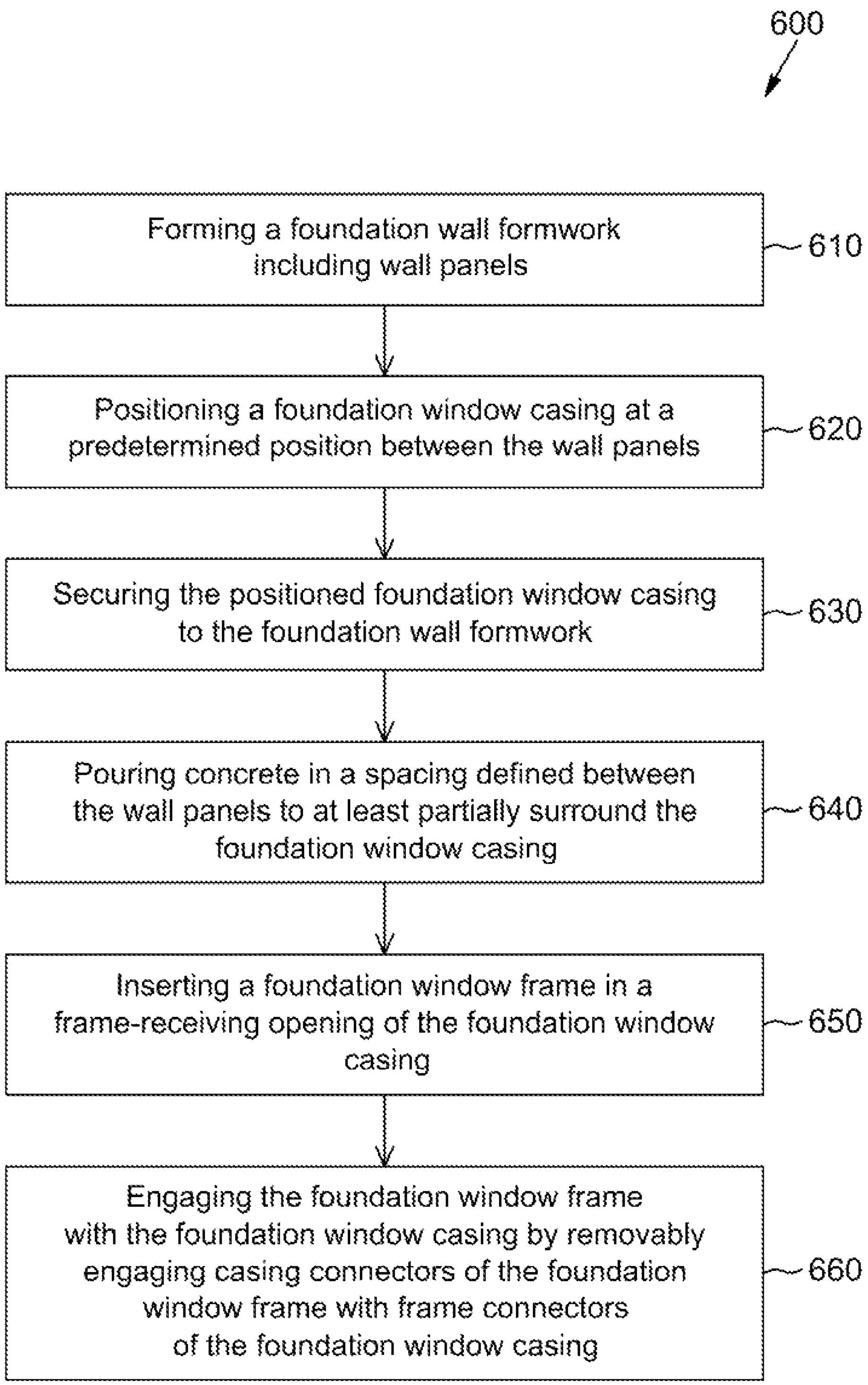
FIG. 13 is a block diagram representing the different steps of a method for installing a foundation window frame into a foundation wall.

As best shown in FIGS. 11 and 12, in the embodiment shown, the foundation window assembly 100 might further comprise a plurality of window panels 500 at least partially insertable into the window screen-receiving opening 402 of the window frame 400, and at least partially receivable into the window panel-receiving cavities 467 defined by the window-supporting portion 460.

The foundation window assembly 100 might further comprise a windowsill 510 at least partially engageable into the windowsill-receiving cavity 416 formed in the lower frame member 410.

It is appreciated that the shape, the configuration, and the location of the foundation window assembly 100 and its different components can vary from the embodiment shown.

Method for Installing a Foundation Window Frame into a Foundation Wall

According to another aspect of the disclosure, there is provided a method 600 for installing a foundation window frame 400 into a foundation wall 10.

The method according to embodiments of the present disclosure may be carried out with a foundation window assembly 100 as the one described above.

In the embodiment shown, the method 600 comprises a step 610 of forming a foundation wall formwork including wall panels defining a spacing inbetween. The method 600 further comprises a step 620 of positioning a foundation window casing 200 at a predetermined position between the wall panels of the foundation wall formwork. The method 600 further comprises a step 630 of securing the positioned foundation window casing 200 to the foundation wall formwork, the foundation wall casing comprising a plurality of casing members 210, 220, 230, 240 defining together a frame-receiving opening 202 and one or more frame connectors 250 located on at least one of the plurality of casing members. The method 600 also comprises a step 640 of pouring concrete (or any other suitable material) in the spacing defined between the wall panels to at least partially surround the foundation window casing 200 (i.e. a step of building the foundation wall 10).

The method 600 also comprises a step 650 of inserting a foundation window frame 400 in the frame-receiving opening 202, the foundation window frame 400 having an outer face 464 and comprising a plurality of frame members 410, 420, 430, 440 defining together a window frame perimeter 404 having a frame thickness Tf and one or more casing connectors 450 extending inwardly along at least a portion of the frame thickness; and a step 660 of engaging at least partially the foundation window frame 400 with the foundation window casing 200 by removably engaging the casing connectors 450 with the frame connectors 250 (i.e. a step of snapping the window frame 400 to the window casing 200 by coupling together the frame and casing connectors). In the embodiment shown, the step 660 of engaging at least partially the foundation window frame 400 with the foundation window casing 200 is realized from an exterior of the foundation wall 10 (i.e. from an outer surface thereof).

The step of inserting the foundation frame 650 might be realized either before positioning the foundation window casing 200 at the predetermined position in the foundation wall formwork or after pouring the concrete in the spacing defined by the panels.

In some embodiments, the foundation window frame 400 is engaged with the foundation window casing 200 until the outer face 464 of the foundation window frame 400 is substantially in a same plane as the outer surface 12 of the foundation wall 10.

In some embodiments, prior to the step 620 of positioning the foundation window casing 200 at a predetermined position between the wall panels of the foundation wall formwork, the method might comprise inserting removable stiffeners (or buck braces or casing braces) in the frame-receiving opening of the foundation window casing 200 so as to limit the risk of distorting the window casing 200 upon concrete pouring and removing the stiffeners once concrete has been poured and prior to the insertion of the window frame into the frame-receiving opening.

To remove the window frame 400 from the foundation wall 10, the window frame 400 should be disengaged from the window casing 200 (i.e. the casing connectors should be disengaged from the frame connectors). To this end, for instance, an adapted tool could be inserted from the interior of the foundation wall into a tool-receiving slot 601—or tool-receiving aperture 601 (FIG. 3) formed between the corresponding frame and casing members, so as to reach the casing connector and to disengage the casing connector 452 from the frame-engaging recess 254.

In other words, in the embodiment shown, as represented for instance in FIG. 3, at least one of the plurality of casing members 210, 220, 230, 240 and a corresponding one of the plurality of frame members 410, 420, 430, 440 are spaced apart along at least a portion of the frame thickness Tf when the window frame 400 and the window casing 200 are engaged with each other (i.e. when the window frame 400 is inserted into the frame-receiving opening 202) so as to define the tool-receiving aperture 601 inbetween. In the embodiment shown, the tool-receiving aperture 601 opens into an inner face of the foundation window assembly 100 (i.e. is reachable from inside of the building a foundation wall of which comprises the integrated window assembly 100). In the embodiment shown, at least a portion of the casing connector 450 (for instance at least a portion of the casing-connecting portion 456 thereof) is arranged in the tool-receiving aperture 601.

As shown in FIG. 3, when the window frame 400 and the window casing 200 are engaged with each other, the casing flange portion 262 of the window casing 200 at least partially surrounds the outer flange portion 462 of the window frame 400. Moreover, as represented in FIG. 3, when the window frame 400 and the window casing 200 are engaged with each other, the casing connector 450 is at least partially sandwiched between the outer flange portion 462 and the frame-engaging portion 266.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

The invention claimed is:

1. A foundation window frame in combination with a foundation window casing integrable to a foundation wall, the foundation window casing comprising a plurality of casing members defining together a frame-receiving opening and at least one frame connector located on at least one of said plurality of casing members, said at least one frame connector comprising a frame-engaging recess formed in at least one of said plurality of casing members and at least partially circumscribing the frame-receiving opening, the foundation window frame being at least partially insertable into the frame-receiving opening and comprising:

- a plurality of frame members defining together a window frame perimeter and having each a frame thickness, at least one of said plurality of frame members comprising an outer flange portion having an inner face and being engageable with at least one of said plurality of casing members; and
- at least one casing connector extending inwardly from the inner face of the outer flange portion of said at least one of said plurality of frame members along at least a portion of the frame thickness thereof, said at least one casing connector comprising a frame-member mounting portion and a casing-connecting portion with a proximal connecting hook and a distal connecting hook, wherein, considered in the frame thickness, the proximal connecting hook extends between the frame-member mounting portion and the distal connecting hook, the casing-connecting portion being removably engageable into the frame-engaging recess.

2. The foundation window frame according to claim 1, wherein said at least one of said plurality of frame members comprises a window-supporting portion forming at least partially the window frame perimeter, the outer flange portion projecting from said window-supporting portion.

3. The foundation window frame according to claim 1, wherein the outer flange portion has an outer face, and wherein the foundation window casing has an outer face configured to be substantially in a same plane as the outer face of the outer flange portion when the foundation window frame is at least partially inserted into the frame-receiving opening.

4. The foundation window frame according to claim 1, wherein, considered in the frame thickness, the proximal connecting hook has greater dimensions than the distal connecting hook, at least one of the proximal and distal connecting hooks being at least partially removably engageable into the frame-engaging recess.

5. The foundation window frame according to claim 1, wherein said at least one casing connector comprises a plurality of spaced-apart casing connectors extending at least partially around the window frame perimeter.

6. The foundation window frame according to claim 1, wherein at least one of the plurality of casing members has a casing thickness substantially equal to the frame thickness of at least one of said plurality of said plurality of frame members.

7. A foundation window assembly for a foundation wall, the foundation window assembly comprising:

- a window frame comprising:
  - a plurality of frame members, and
  - at least one casing connector extending from at least one of said plurality of frame members; and
- a window casing integrable to the foundation wall upon building thereof, the window casing comprising:
  - a plurality of casing members defining together a frame-receiving opening, wherein at least one of said plurality of casing members defines a frame-abutting shoulder and comprises:
    - a casing flange portion, and
    - a frame-engaging portion,
    - wherein the casing flange portion and the frame-engaging portion at least partially delimit together the frame-abutting shoulder;
- wherein a frame-engaging recess is formed in the frame-engaging portion, the frame-engaging recess at least partially circumscribing the frame-receiving opening, said at least one casing connector being removably engageable into the frame-engaging recess when the window frame is inserted into the frame-receiving opening;
- wherein the plurality of frame members each have a frame thickness and define together a window frame perimeter, at least one of said plurality of frame members comprising a window-supporting portion forming at least partially the window frame perimeter and an outer flange portion projecting from said window-supporting portion and having an inner face, wherein said at least one casing connector extends inwardly from the inner face of the outer flange portion of said at least one of said plurality of frame members along at least portion of the frame thickness thereof and is removably engageable into the frame-engaging recess when the window frame is inserted into the frame-receiving opening and wherein the casing flange portion has an outer face, the outer flange portion having an outer face configured to be substantially in a same plane as the outer face of the casing flange portion when the window frame is at least partially inserted into the frame-receiving opening.

8. The foundation window assembly according to claim 7, wherein said at least one of said plurality of casing members has a casing member length, the frame-engaging recess extending along at least a portion of the casing member length.

9. The foundation window assembly according to claim 7, wherein said at least one of said plurality of casing members defines two opposed frame-abutting shoulders.

10. The foundation window assembly according to claim 9, wherein said at least one of said plurality of casing members comprises a substantially planar central portion extending between said two opposed frame-abutting shoulders.

11. The foundation window assembly according to claim 7, wherein said at least one casing connector is at least partially sandwiched between the outer flange portion and the frame-engaging portion when the window frame is engaged with the window casing.

12. The foundation window assembly according to claim 7, wherein the foundation window assembly has an outer face at least partially formed by the outer face of the casing flange portion and the outer face of the outer flange portion, and an opposed inner face, wherein said at least one of said plurality of casing members and said at least one of said plurality of frame members are spaced apart along at least a portion of the frame thickness thereof so as to define a tool-receiving aperture inbetween, the tool-receiving aperture opening into the inner face of the foundation window assembly, wherein at least a portion of said at least one casing connector is arranged in the tool-receiving aperture.

13. The foundation window assembly according to claim 7, wherein the plurality of frame members comprises lower, upper and first and second side frame members, and the plurality of casing members comprises lower, upper and first and second side casing members removably engageable respectively with the lower, upper and first and second side frame members, the frame-engaging recess being a lower frame-engaging recess and the frame-engaging portion being a lower frame-engaging portion, the lower casing member comprising the lower frame-engaging portion with the lower frame-engaging recess formed therein, wherein the upper, first and second side casing members comprise respectively upper, first and second frame-engaging portions with upper, first, and second frame-engaging recesses formed respectively therein, the upper, lower, first, and second frame-engaging recesses circumscribing substantially entirely the frame-receiving opening.

14. The foundation window assembly according to claim 7, wherein at least one of the window casing and the window frame is an extruded profile.

15. The foundation window assembly according to claim 7, wherein said at least one casing connector and said frame-engaging recess connector form together a snap-fit connector assembly.

* * * * *